Dec. 1, 1936.  J. H. COHEN  2,062,701
CIGAR LIGHTER HEATING ELEMENT
Filed Aug. 17, 1935
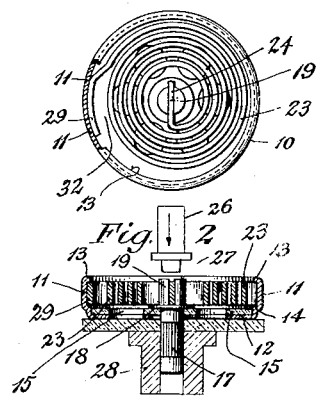
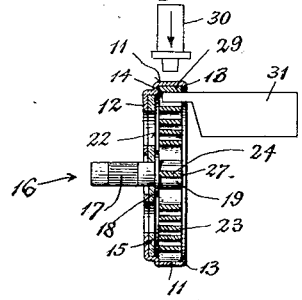
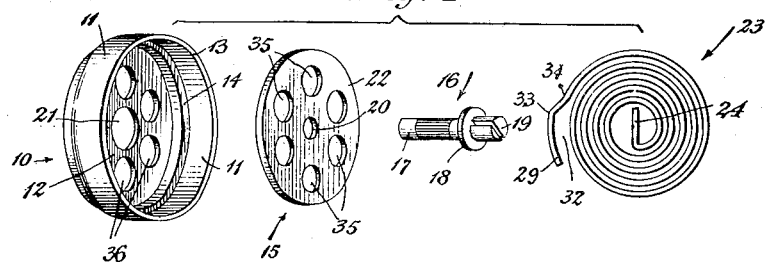

Patented Dec. 1, 1936

2,062,701

UNITED STATES PATENT OFFICE 2,062,701

CIGAR LIGHTER HEATING ELEMENT

Joseph H. Cohen, Bridgeport, Conn., assignor to Casco Products Corporation, Bridgeport, Conn., a corporation of Connecticut Application August 17, 1935, Serial No. 36,683

5 Claims. (Cl. 219—32)

This invention relates to heating elements of electric devices such as cigar and cigarette lighters, and more particularly to the method of making electrical connection to the ends of the heating elements of these devices.

In one of the conventional types of electric cigar and cigarette lighters there is a small spiral heating element in a metal cup. Current is led through the heating element by means of a connection to the cup and a connection to a small centrally located metal pin. The complete heating units thus made tested perfectly at the factory, but despite the use of good materials and good workmanship, lost their efficiency after being in use for a while, with the result that a longer time was required to bring the element to a proper degree of heat for lighting cigars and cigarettes. The reason for this was not apparent.

However, suspecting that the difficulty arose from poor contact to the heating element, I have found that, while the connections were satisfactory mechanically, yet oxidation gradually rendered them poor electrically. Thus there existed in effect a partial insulation between the ends of the heating element and the metal conducting and supporting structures. I have found that by welding both clean bright ends of the heating element individually to the clean and bright parts which respectively conduct the current to the element so that these connections become substantially integral, oxidation will not cause a partial insulation at the joints, and the efficiency and resistance of these joints will remain substantially constant, regardless of the period of time over which the element is in use. Therefore a heating unit having both ends of the heating element welded separately to the metal conducting and supporting parts provides a uniformity and efficiency of operation not heretofore attained in heating units made previously to this invention.

It is a particular object of this invention, therefore, to provide a heating unit which has permanent electrically-perfect connections between the heating element and the metal parts which conduct the current to and from said heating element.

A feature of this invention is the provision of permanent electrically perfect connections to the heating element without complicating the construction of the heating unit, nor the manufacturing operations required in fabricating it.

Other advantages and features will hereinafter appear.

In the drawing:

Figure 1 is a top view of the heater unit of this invention, showing a spiral heating element placed within a shallow metal cup.

Fig. 2 is a sectional view of the heater unit, and shows a welding electrode about to be applied to the center of the spiral element.

Fig. 3 is a sectional view of the heater unit, and shows welding electrodes in position for joining the outer end of the heating element to the rim of the containing current-conducting cup.

Fig. 4 is an exploded view of the heater unit.

The metal case 10 of the heater unit of the present invention in its present preferred form has the shape of a shallow cup, and has vertical walls 11 and a bottom 12. The rim 13 of the walls 11 is turned in, to present a smooth outer surface. A shoulder 14 is provided at the inner base of the walls 11, and forms a recess into which an insulating washer 15 fits, and is centered. This insulating washer 15 is made of some suitable heat resistant material, preferably of mica. A connection pin 16 has a shank 17 merging into an integral flange 18, and a slotted head 19. The shank 17 of the pin 16 passes through an aperture 20 in the center of the insulating washer 15, and through a larger central aperture 21 in the bottom 12 of the cup 10. The aperture 21 of the cup is sufficiently larger than the shank 18 of the pin so that a substantial clearance is had between said shank and the edges of the aperture. This clearance is maintained uniformly at all points because the pin is held centrally in the insulating washer 15 which in turn is centered by the shoulder 14 in the bottom of the cup.

The flange 18 of pin 16 fits against the face 22 of the insulated washer 15 and acts as a thrust member to keep the pin from being drawn completely through and out of apertures 20 and 21. By virtue of the insulating washer 15 interposed between the flange 18 of pin 16 and the bottom 12 of the cup 10, and by virtue of the clearance between the shank 17 of pin 16 and the edges of the aperture 21 in the bottom of the cup, a positive electrical insulation is effected between the pin 16 and the cup 10, and therefore these two members, being properly insulated from each other, are used to conduct current to and from a heating element now to be described.

The heating element 23 of the present invention in its present preferred form consists of a spirally wound flat ribbon made of a special electrically-resistant alloy having a high melting point. Preferably it is made of the material known as nichrome. The spiral element 23 is of a size to fit easily into the metal cup 10, and so that the convolutions of the element can be spaced from each other in order that no electrical contact is made between these. The flat ribbon of the element 23 is of a length and cross-sectional area and therefore of a resistance, such that it attains a rapid and intense but safe heat when connected across the usual current supply of a motor vehicle.

The inner end 24 of the spiral element 23 is straight, and bends inwardly at an angle so as to extend diametrically and fit within the slot in the head 19 of the center connection pin 16, providing thereby one point of connection to the heating element.

In the present invention, it is proposed to so join the heating element to its current conducting members that there will result a uniform high efficiency of the unit, and that perfect and permanent electrical connections will be constantly maintained regardless of the period of time the element is in use. To this end, therefore an electrically welded joint is made between the inner extremity 24 of the element 23, and the head 19 of the connection pin 16, by applying the welding electrode 26, see Fig. 2, connected to suitable apparatus for supplying a welding electric current, to the juncture 27 of these parts, the return electrical circuit being furnished by means of the collar-contact 28 connecting with the pin 16. This welding of the connection pin 16 to the heating element 23 fuses the metals of these two parts and positively prevents oxidation or contact resistance from altering the high efficiency of the joint.

The welding of only one end of a heating element to its conducting member, as I understand it now does not solve the problem of producing a permanently efficient heating unit. Both ends must be welded, for if either contact be a purely mechanical and frictional connection, this, being subject to heat and continual and unequal expansion and contraction, will in time oxidize and become dirty, and alter considerably the efficiency of the heating unit as a whole and lengthen the time required for it to attain proper temperature.

Accordingly, the outer extremity 29 of heating element 23 is also welded to the conducting metal cup 10. This may be done by means of welding electrodes 30, and 31, see Fig. 3, the latter electrode being inserted in the space 32 provided in the spiral element 23 by offsetting the extremity 29 outward which is accomplished by the reverse bends 33 and 34, in the element.

Thus there is accomplished by the welding of both ends of the heating element to their respective conducting members, a high electrical efficiency of the joints and a uniform operating characteristic of the unit as a whole.

For the purpose of providing for heat and light radiation from the bottom side of the spiral heating element of the present invention in its present preferred form, there are provided circularly disposed holes 35 in the insulating washer 15, and corresponding holes 36 in the cup 10.

Variations and modifications may be made within the scope of this invention, and portions of the improvements may be used without others.

Having described the invention, what is claimed as new and for which it is desired to obtain Letters-Patent, is:—

1. A heating unit for electric cigar and cigarette lighters comprising a metal cup; a central current-conducting pin; and a spiral heating element having an electric-current connection to the central current-conducting pin, and having an outer extremity offset to allow for insertion of a welding electrode and welded directly to the metal cup, thereby providing for a permanently consistent heating of the element.

2. A heating unit for electric cigar lighters comprising a metal cup; a central current conducting pin having a slotted head; and a spiral heating element having a diametrically extending inner extremity fitting in the slotted head of said central current conducting pin, and an outer extremity offset to allow for insertion of a welding electrode and welded directly to the walls of the metal cup.

3. A heating unit for electric cigar lighters comprising a metal cup; a central current-conducting pin; and a spiral heating element having its inner extremity welded directly to the central connection pin, and its outer extremity offset to allow for insertion of a welding electrode, and welded directly to the walls of the metal cup.

4. A heating unit for cigar lighters comprising a metal cup; a central current conducting pin having a slotted head; and a spiral heating element having a diametrically extending inner extremity fitting in the slotted head of said central current conducting pin and welded directly thereto, and an outer extremity offset to allow for insertion of a welding electrode, and welded directly to the walls of the metal cup.

5. A heating unit for electric cigar and cigarette lighters comprising a metal cup; a central current-conducting pin; a spiral heating element having its inner extremity welded directly to the central connection pin, and its outer extremity offset to allow for insertion of a welding electrode and welded to the walls of the metal cup; and an insulating disk between the heating element and the bottom of the metal cup and insulating all but said offset extremity from contact with said cup.

JOSEPH H. COHEN.